United States Patent [19]
de Maudave

[11] 4,023,954
[45] May 17, 1977

[54] METHOD OF PRODUCING HIGH PROTEIN FERTILIZERS AND BIRD AND STOCK FEED FROM WASTE

[76] Inventor: Christian Fayd'Herbe de Maudave, Lawnbrook Road, Bickley Valley, Western Australia, Australia

[22] Filed: Dec. 9, 1975

[21] Appl. No.: 639,109

[30] Foreign Application Priority Data

Dec. 12, 1974  Australia .................... 9988/74

[52] U.S. Cl. .................... 71/15; 71/11; 71/21; 71/64 DC; 426/456; 426/1
[51] Int. Cl.² .................... C05F 3/00
[58] Field of Search ........... 71/6, 11, 12, 13, 15, 71/20, 21, 64 DC

[56] References Cited

UNITED STATES PATENTS

| | | | |
|---|---|---|---|
| 2,906,615 | 9/1959 | Dumore | 71/21 X |
| 3,372,018 | 3/1968 | Stocker et al. | 71/21 |
| 3,716,371 | 2/1973 | Calvert et al. | 71/21 X |

FOREIGN PATENTS OR APPLICATIONS

| | | | |
|---|---|---|---|
| 6,902,007 | 2/1969 | Netherlands | 71/21 |
| 489,710 | 8/1938 | United Kingdom | 71/21 |

OTHER PUBLICATIONS

Newsweek, June 21, 1976 – pp. 67–68 – Agriculture: Worming Away, Langway, et al.
Bruttini–Uses of Waste Material, pp. 198–199, 256–257, 1923.

*Primary Examiner*—Frank A. Spear, Jr.
*Assistant Examiner*—Ferris H. Lander

[57] ABSTRACT

A method of producing fertilizer by taking manure which comprises numerous species of beetles, mixing other organic waste with said manure and allowing the stockpile to stand for a predetermined time, feeding said stockpile through a crusher into a drier, subjecting the organic matter to a secondary crusher, conveying the finely crushed material to a second stockpile, allowing said second stockpile to stand for a predetermined time then re-passing the organic matter through the drier and the secondary crusher.

9 Claims, 1 Drawing Figure

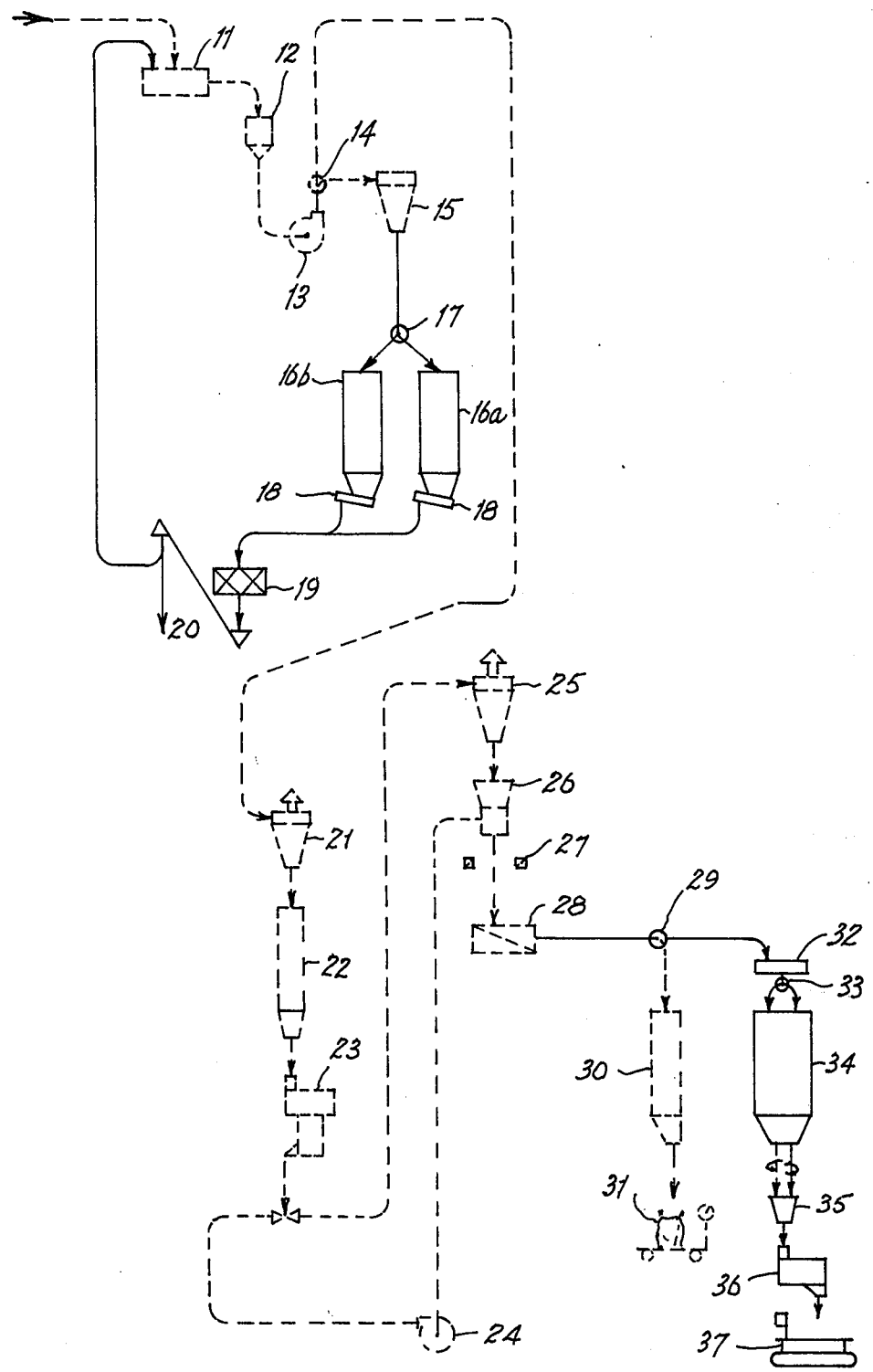

METHOD OF PRODUCING HIGH PROTEIN FERTILIZERS AND BIRD AND STOCK FEED FROM WASTE

This invention relates to a method of producing high protein fertilizers and bird and stock feed from waste.

In the past, the world has been using up to one third of its valuable grain crops for stock feed whilst in some countries millions of people would be starving. It is one of the objects of this invention to create a suitable stock feed substitute so that grain crops can be used toward sustaining human life.

In one form of the invention resides in a method of producing fertilizer by taking manure which comprise numerous species of beetles, mixing other organic waste with said manure and allowing the stockpile to stand for a predetermined time, feeding said stockpile through a crusher into a drying tunnel crushing the organic matter by suitable means and conveying the finely crushed material to a second stockpile, allowing said second stockpile to stand for a predetermined time then re-passing through a drying tunnel for secondary drying and crushing.

In another form the invention resides in the production of bird and stock feed comprising taking manure which comprises numerous species of beetles, mixing other organic waste with said manure and allowing the stockpile to stand for a predetermined time, feeding said stockpile through a crusher into a drying tunnel, crushing the organic matter by suitable means and conveying the finely crushed material to a second stockpile, allowing said second stockpile to stand for a predetermined time and then re-passing through a drying tunnel for secondary drying and crushing, crushed material then conveyed to a conventional pelletized machine and pelletised, feed pellets are then transferred to a cooling tower and air cooled and then graded according to size.

Throughout the remainder of the specification, the term manure shall be described with specific reference to fowl manure although other animal or bird waste may also be used.

The invention will be better understood by reference to the following description of one specific embodiment as shown in the accompanying drawing which is a flow diagram of the process.

In this embodiment, a high protein fertilizer additive is provided from basic fowl manure taken from poultry farms or the like. Health regulations generally state that the floor in large commercial poultry sheds must be formed of concrete or other similar material. In this particular process a solid floor of this type is not used and the bird droppings are allowed to fall directly on the earth floor. Because of the complete absence of a conventional concrete floor and the total absence of insecticides a large number of beetles come out of the earth and live in the manure heaps. Several varieties (species) of beetles live and work on the manure heaps and anything that may happen to be added to the heap; such as broken eggs, and dead fowls. The type of beetles found in the manure heap are *Heteronychus aratro F.*, *Creophilus erythrocephalus F*, *Dermestes maculatus De Geer*, *Ptomaphila lacrymosa Schreibers*, *Saprinus australis Boisduval*, *Necrobia rufyies De Geer*. The presence of *Heteronychus arator F.* is considered to the accidental and plays a very small part in the process. They are more likely to have been attracted to the poultry shed due to the bright lighting used.

Beetles *Creophilus erythrocephalus F*, *Saprinus australis Boisduval* and *Necrobia rufyies De Geer* are all predators and play a major part in the process by feeding on other insects, maggots, fly larvae, dead fowls and other matter which may be in or on the actual manure heap. Any bird carcass that becomes flyblown is completely decomposed with the air of these beetles, in approximately three days. The area is free of diseases and health authorities have give the poultry sheds permission to proceed following extensive tests for signs of salmonella (a bacteria causing disease in man and animals). Within the poultry shed the birds droppings are allowed to develop into manure heaps for a period of approximately one year, during which time if it is necessary the heap is spread to assist in drying of the manure or dung. In spreading the heap, it also ensures that the apex of the heap is kept away from the eggs. being produced and away from the feet of the birds.

When a manure heap is ready to be processed, all but the bottom six inches is removed and placed in a stockpile. The lower six inches containing beetles to regenerate and work on the new heap. The stockpile which contains fowl manure, carcasses, feathers, egg shell etc and the beetles has other organic waste added to it such as fruit and vegetable wastes, fish oil, waste meat, fat and bone from abattoirs and butchers and the like. All of this waste is mixed into one stock pile and the beetles are allowed to work on the organic substances for approximately one week. At the end of one week the stockpile is passed through a crusher of the hammer mill type or similar and the crushed material fed onto an elevator and passed through a tunnel oven or dryer. The oven or dryer is set to operate at approximately 500° C. and has the effect of reducing the manure humidity from 60–70% down to approximately 15%.

The process involved after the initial stockpile has been passed through a first crusher and dried is shown and now explained with reference to the drawing.

The manure passing through the oven or drier 11 is allowed to fall into a secondary crusher 12 of the hammer mill or similar type. For the production of fertilizer additive the finely crushed matter is conveyed by air from the blower 13 to cyclone 15 via control valve 14. Cyclone 15 then feeds the crushed matter into one or more large storage silos 16A, 16B. The flow of the crushed matter into separate storage silos being controlled by a diverter valve 17. The crushed material in storage silos 16A and 16B is stored for approximately one week. At the end of this period the crushed matter is discharged from the silos by way of inclined dischargers 18 into an inclined mobile auger 19. and then back into the oven or drier 11. The matter within the drier is dried, and passed once again through the crusher 12 and conveyed by means described above into the storage silos 16A and 16B. When required for sale, the material is discharged by inclined dischargers 18 and mobile auger 19 and bagged or fed into containers for sale at station 20. The resultant product being suitable for use as a high protein fertilizer or additive for fertilizers.

If the organic waste is required as a stock or bird feed the crushed matter after having passed through the drier or oven 11 and crusher 12 for a second time is conveyed to cyclone 21 by forced air supplied by fan 13. Control valve 14 being set to close off cyclone 15 and allow the passage of matter to cyclone 21. Matter collected in cyclone 21 is stored in bin 22 for use by pellet mill 23. In the pellet mill 23 which is of conventional type, the crushed matter is compressed and forced through a die ring and cut by knives to the required length. The formed pellets are blown by fan 24 through cyclone 25 to a cooling tower 26. Here the pellets are cooled by the use of the air and then carried by a bucket elevator 27 to a sieve 28 and graded according to size. Following grading, the pellets passage is controlled by manual valve 29, according to whether a system of manual weighing and bagging is employed or alternatively a more automatic system as shown on the right of the drawing. If the pellets are being processed in a small volume, then valve 29 may be set so that the pellets pass into packing storage bin 30 from which they can be extracted, weighed and bagged at station 31. Alternatively the valve 29 may be set to allow the pellets to pass to a distribution conveyor 32 from which a further valve 33 can control the flow of pellets to large storage silos 34 and eventually through pre-weighing collection hopper 35 to automatic weighing station 36 and bagging station 37. The resultant bagged pellets are then ready for sale and use as a feed supplement for either birds or stock.

Several factors are important in the pelletizing of fowl manure (with other organic additives). One such factor is the percentage of fat contained in the product. If a fat content of 2% exists, the wear and tear on the pellet mill is excessive and numerous tests have shown that approximately 5% fat produces a good pellet and has little effect on the machinery. The fat being added to the initial stock pile by way of meat waste and fish oil, from the "fish and chip" shops, or the like.

In the case of poultry feed the birds are fed 10–20% of the new re-cycled pellets with their normal feed. The protein content of the pellets is approximately 25% which is 10% higher than that of the standard poultry feed. Because of the high protein factor the amount of pellets fed to the birds must be controlled, as excessive amounts cause the birds to get fat and they stop laying.

Where the pellets are required for stock feeding a larger die is used in the mill and organic waste of lucerne, meatmeal, and molasses are added to the initial stockpile.

In the pelletizing process, no steam is used as the fat and slight moisture content in the material is sufficient to bond the material together when pressure is applied.

The calcium in the pellets is of a broken down form which is easier to digest and eliminates the need to add shell grit to the poultry feed.

Whilst the invention has been described with reference to one specific embodiment, namely the production of fertilizer and pellets for poultry feed, it is not limited thereto. With the use of the poultry manure as a base, other organic waste such as winemaking refuse, lawn cuttings, skins and pips from fruit and vegetable canneries, abbattoirs, wool scouring, human waste, household waste and many others may be added to the initial stockpile to produce a variety of pelletized feed.

The claims defining the invention are as follows:

1. A method of producing fertilizer comprising the steps of taking manure which comprises numerous species of predatory beetles, mixing other organic waste with said manure to form a stockpile and allowing the stockpile to stand for a predetermined time to allow said beetles to work on said manure to break down organic matter, feeding said stockpile through a crusher into a drier, subjecting the dried matter to a secondary crusher, conveying the finely crushed material to a second stockpile, allowing said second stockpile to stand for a predetermined time then re-passing the second stockpile through the drier and the secondary crusher.

2. A method of producing bird and stock feed comprising the steps of taking manure which contains numerous species of predatory beetles, mixing other organic waste with said manure to form a stockpile and allowing the stockpile to stand for a predetermined time to allow said beetles to work on said manure to break down organic matter, feeding said stockpile through a crusher into a drier, subjecting the dried matter to a secondary crusher, conveying the finely crushed material to the second stockpile, allowing said second stockpile to stand for a predetermined time then re-passing the second stockpile through the drier and the secondary crusher, passing the crushed matter to a conventional pelletizing machine and transferring the formed pellets to a cooling tower and cooling said pellets with air.

3. A method of producing fertilizer as claimed in claim 1 wherein the manure is fowl manure.

4. A method of producing bird and stock feed as claimed in claim 2 wherein the manure is fowl manure.

5. A method of producing fertilizer as claimed in claim 1 wherein the manure being passed through the drier is subjected to heat of approximately 500° C to reduce the humidity of the manure down to approximately 15%.

6. A method of producing bird and stock feed as claimed in claim 2 wherein the manure being passed through the drier is subjected to heat of approximately 500° C to reduce the humidity of the manure down to approximately 15%.

7. A method of producing bird and stock feed as claimed in claim 2 wherein the crushed matter entering the said pelletizing machine contains approximately 5% fat.

8. A fertilizer produced by the method claimed in claim 1,

9. A bird or stock feed produced by the method claimed in claim 2.

* * * * *